US008572701B2

(12) United States Patent
Rathbun (10) Patent No.: US 8,572,701 B2
(45) Date of Patent: Oct. 29, 2013

(54) AUTHENTICATING VIA MOBILE DEVICE (75) Inventor: George Steven Rathbun, Mystic, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 53 days.

(21) Appl. No.: 13/214,529

(22) Filed: Aug. 22, 2011

(65) Prior Publication Data

US 2013/0055362 A1  Feb. 28, 2013

(51) Int. Cl.
*H04L 9/32* (2006.01)
*G06Q 20/00* (2012.01)
(52) U.S. Cl.
USPC ............... 726/6; 726/2; 726/3; 726/4; 726/5; 726/21; 713/168; 713/182; 705/67; 705/72; 705/75
(58) Field of Classification Search
USPC .................... 726/2–6, 21; 713/168, 182–186; 705/67, 72, 50, 75; 709/219, 225
See application file for complete search history.

(56) References Cited

U.S. PATENT DOCUMENTS

| 7,318,234 | B1 * | 1/2008 | Dharmarajan ..................... 726/2 |
| 7,606,560 | B2 * | 10/2009 | Labrou et al. .................. 455/411 |
| 7,822,688 | B2 * | 10/2010 | Labrou et al. ................... 705/67 |
| 2005/0187873 | A1 * | 8/2005 | Labrou et al. ................... 705/40 |
| 2008/0046988 | A1 * | 2/2008 | Baharis et al. ..................... 726/7 |
| 2008/0098225 | A1 * | 4/2008 | Baysinger ...................... 713/171 |
| 2010/0100725 | A1 * | 4/2010 | Ozzie et al. .................... 713/155 |
| 2011/0086616 | A1 * | 4/2011 | Brand et al. ................... 455/411 |
| 2011/0209200 | A2 * | 8/2011 | Mr. White et al. ................ 726/4 |
| 2011/0289573 | A1 * | 11/2011 | Seidl et al. ........................ 726/7 |
| 2012/0089847 | A1 * | 4/2012 | Tu et al. ........................ 713/182 |

OTHER PUBLICATIONS

A mobile based approach to strong authentication on Web, Gianluigi Me et al, IEEE, 2006.*
Gianluigi Me et al, A mobile based approach to strong authentication on Web, IEEE, 2006.*

* cited by examiner

*Primary Examiner* — Philip Chea
*Assistant Examiner* — Shanto M Abedin (57) ABSTRACT

A first server device is configured to receive an authentication request from a second server device; add the authentication request to a queue associated with a user; and provide a representation of the queue to a mobile device of the user. The representation of the queue includes an entry for the authentication request. The first server device is further configured to receive, from the mobile device, authentication information, provided by the user, for the authentication request; determine that authentication, of the user, for the authentication request is successful based on the authentication information; generate an authentication response that indicates that the authentication, of the user, for the authentication request is successful; and transmit, by the first server device, the authentication response to the second server device.

20 Claims, 8 Drawing Sheets

AUTHENTICATING VIA MOBILE DEVICE

BACKGROUND

A user uses a computer to access a web service (e.g., an online banking portal) provided via a website. Before providing access to the web service, the website often requires the user to use the computer to enter secret authentication information (e.g., a password). The website provides the access to the web service after the computer transmits the secret authentication information to a web server associated with the website and the user is authenticated based on the secret authentication information. The user is subjected to man-in-the-middle (MITM) attacks when the secret authentication information is being transmitted from the computer to the web server. An MITM attack may include an attacker stealing (i.e., intercepting) the secret authentication information when the secret authentication information is transmitted.

DETAILED DESCRIPTION OF PREFERRED EMBODIMENTS

The following detailed description refers to the accompanying drawings. The same reference numbers in different drawings may identify the same or similar elements An implementation, described herein, may provide authentication, for a web service, via a mobile device. For example, a website may require a user to be authenticated before providing access to a web service of the website. In one implementation, a user may use a computer terminal to provide a non-secret unique identifier (e.g., a username, a telephone number, an email address, etc.) to a web server that hosts the website. The web server may transmit an authentication request, for the user, to an authentication server (e.g., of a cellular service provider associated with the user). The authentication server may add the authentication request to an end of a queue associated with the user. The authentication server may transmit, to one or more mobile devices associated with the user, notifications that the authentication request has been added to the queue.

The user may use a mobile device to access a client (e.g., a web interface) used for accessing a list and/or any other representation of pending authentication requests in the queue of the user. The user may select the authentication request. The authentication server may prompt the user to provide authentication information (e.g., a password, a personal identification number (PIN), a one time passcode, an answer to a challenge question, biometrics information, etc.) required to authenticate the user for the selected authentication request. The user may use the mobile device to provide the authentication information. The authentication server may receive the authentication information, and authenticate the user for the selected authentication request based on the authentication information. Thereafter, the authentication server may transmit an authentication response to the web server that indicates that the user was successfully authenticated for the authentication request. In response to the authentication response, the web server may allow the user to use the computer terminal to access the web service of the website. Because the user uses the mobile device to provide the authentication information, the user is not subject to a MITM attack due to the authentication information or any other secret information, associated with the user, being transmitted between computer terminal 120 and web server 130.

Figure 1:
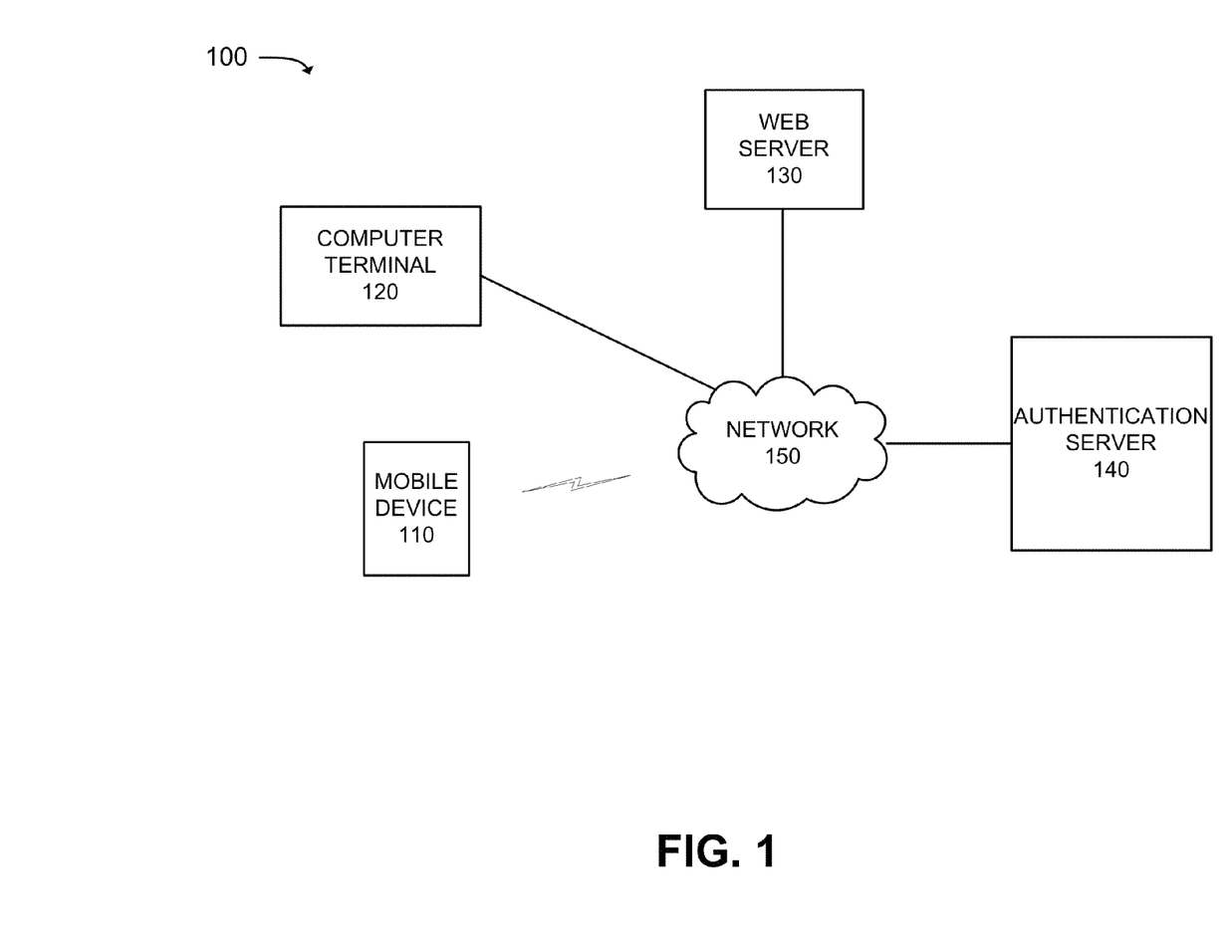
FIG. 1 is a diagram of an example environment in which systems and/or methods described herein may be implemented.

FIG. 1 is a diagram of an example environment 100 in which a system and/or method described herein may be implemented. As shown in FIG. 1, environment 100 may include one or more of the following components: a mobile device 110, a computer terminal 120, a web server 130, an authentication server 140, and a network 150. A single mobile device 110, computer terminal 120, web server 130, authentication server 140, and network 150 have been illustrated in FIG. 1 for simplicity. In practice, there may be more mobile devices 110, computer terminals 120, web servers 130, authentication servers 140, and/or networks 150. Also, in some implementations, one or more of the components of environment 100 may perform one or more functions described as being performed by another one or more of the components of environment 100.

Furthermore, two or more of the components, of FIG. 1, may be implemented within a single device, or a single component may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

Mobile device 110 may include any computation or communication device, such as a communication device that is capable of communicating with authentication server 140 via network 150. In one implementation, mobile device 110 may take the form of a smart phone, a personal digital assistant (PDA), a mobile telephone device, a handheld computer, a personal media player, etc. In another implementation, mobile device 110 may take the form of any computer, including a web service terminal, a personal computer, a laptop computer, or any other device capable of transmitting and/or receiving data.

In one example, mobile device 110 may allow a user of mobile device 110 to access a client to view pending authentication requests associated with the user. The user may use mobile device 110 to select one of the authentication requests and to provide authentication information required for the authentication request. Mobile device 110 may receive the authentication information (e.g., a password, a PIN, a one time passcode, an answer to a challenge question, biometrics information, etc.), and transmit the authentication information to authentication server 140.

Computer terminal 120 may include any computation or communication device, such as a communication device that is capable of communicating with web server 130 via network 150. In one implementation, computer terminal 120 may take the form of any computer, including a web service terminal, a personal computer, a laptop, a handheld computer, a smart phone, a mobile telephone device, a personal media player, etc. Computer terminal 120 may be operated by a user of mobile device 110. Computer terminal 120 may allow the user to access a website associated with a web service provided by web server 130. Computer terminal 120 may receive, from web server 130, and display a log-in webpage for accessing the web service. Computer terminal 120 may receive input(s) from the user, including a request to use wireless authentication and/or a non-secret unique identifier, of the user, in order to access the web service. Computer terminal 120 may transmit the request to use wireless authentication and/or the non-secret unique identifier to web server 130.

In another implementation, computer terminal 120 may be operated by a third party requiring a verification from the user (e.g., an enterprise requiring the user's confirmation/permission and/or digital signature, a party seeking to confirm the user's identity, etc.). In yet another implementation, computer terminal 120 may be a part of web server 130 or be directly connected to web server 130 through network 150, and be operated by an operator of web server 130.

Web server 130 may include any computation or communication device, such as a communication device that is capable of communicating with computer terminal 120 and/or authentication server 140 via network 150. Web server 130 may represent a single server device or a collection of multiple server devices and/or computer systems. Web server 130 may host a website. Web server 130 may handle a transaction (e.g., a request to access an online portal associated with an account of a user, an online purchase, a request for verification of a person's identity, etc.) initiated at computer terminal 120, by a user of mobile device 110 who accesses the website by using computer terminal 120.

Web server 130 may transmit a log-in web page to computer terminal 120 for the user to access the web service/initiate the transaction via the website. Web server 130 may request authentication server 140 to invoke mobile device 110, and request a wireless authentication, of the user, based on a non-secret unique identifier that is selected/entered via the log-in web page. Web server 130 may generate and transmit an authentication request to authentication server 140 to authenticate the user before providing the access to the web service via the website. Web server 130 may receive, from authentication server 140, an approval for the transaction and an authentication response that indicates that the user has been successfully authenticated.

Authentication server 140 may represent a single server device or a collection of multiple server devices and/or computer systems. In one implementation, authentication server 140 may receive authentication requests from web server 130 and/or one or more other web servers that provide different web services. Authentication server 140 may maintain queues for different users, including a queue for a user of mobile device 110. Authentication server 140 may add each one of the received authentication requests to one of the queues. Authentication server 140 may transmit a notification to mobile device 110 to notify the user of mobile device 110 when a new authentication request is added to the queue associated with mobile device 110.

In one example, authentication server 140 may allow a user of mobile device 110 to use mobile device 110 to access a client to view information about pending authentication requests in a queue associated with the user. Authentication server 140 may also allow an operator of web server 130 to access a different client to view information about authentication requests, in one or more of the queues, which are received from web server 130 and/or one or more other web servers associated with the operator.

Authentication server 140 may receive a selection to approve one of the pending authentication requests from mobile device 110. In one implementation, the selected authentication request may include rules that specify what authentication information needs to be provided by the user for the user to accept/approve the selected authentication request. Mobile device 110 may collect the authentication information from the user based on the rules. In another implementation, authentication server 140 may determine what authentication information is required in order to authenticate the user for the selected authentication request. Authentication server 140 may transmit a message to mobile device 110 for the user to provide the authentication information.

Authentication server 140 may receive the authentication information (e.g., with/in a request to accept/approve or reject the selected authentication request) from mobile device 110, and authenticate the user based on the authentication information. Authentication server 140 may transmit, to web server 130, an authentication response that indicates that the user has been successfully authenticated for the selected authentication request.

Network 150 may include a single network, multiple networks of a same type, or multiple networks of different types. For example, network 150 may include one or more of a direct connection between devices, a local area network (LAN), a wide area network (WAN) (e.g., the Internet), a metropolitan area network (MAN), a wireless network (e.g., a general packet radio service (GPRS) network), a telephone network (e.g., a Public Switched Telephone Network (PSTN) or a cellular network), a subset of the Internet, an ad hoc network, a fiber optic network (e.g., a fiber optic service (FiOS) network), or any combination of the aforementioned networks.

Figure 2:
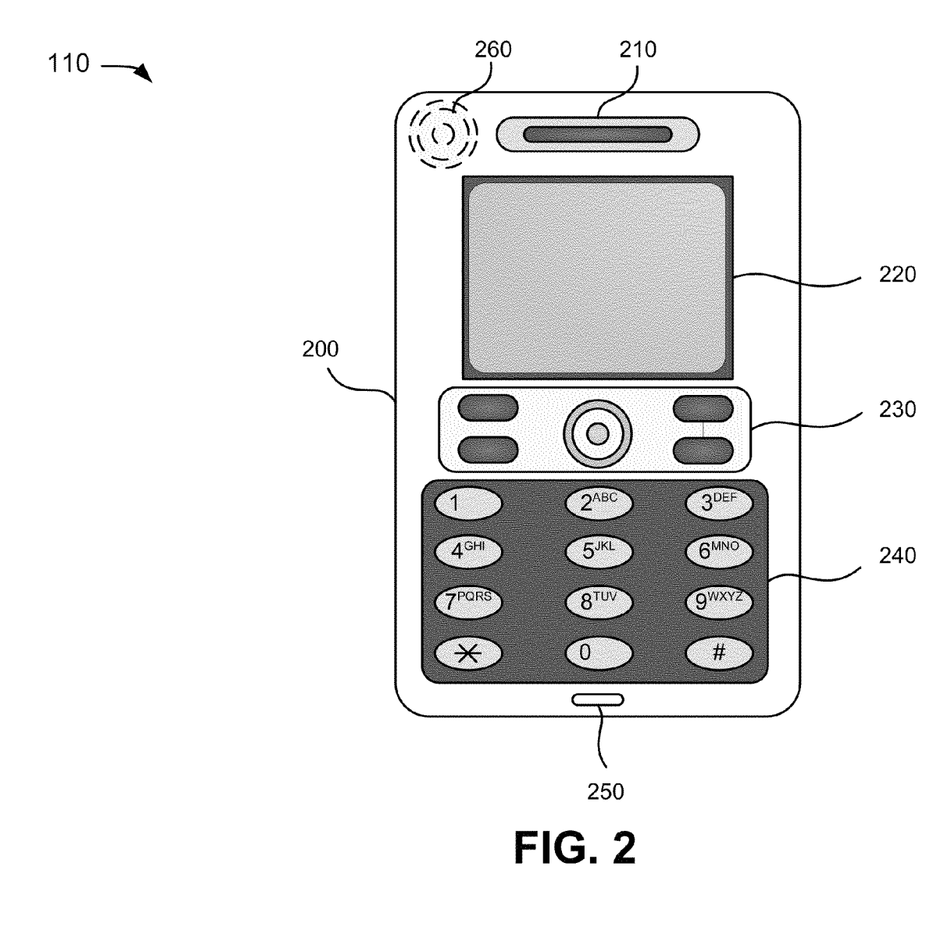
FIG. 2 is a diagram of example components of a mobile device of FIG. 1.

FIG. 2 is a diagram of example components of mobile device 110. As shown in FIG. 2, mobile device 110 may include a housing 200, a speaker 210, a display 220, control buttons 230, a keypad 240, a microphone 250, and/or a camera 260. Housing 200 may include a chassis on which some or all of the components of mobile device 110 are mechanically secured and/or covered. Speaker 210 may include a component to receive input electrical signals from mobile device 110 and transmit audio output signals, which communicate audible information to a user of mobile device 110.

Display 220 may include a component to receive input electrical signals and present a visual output in the form of text, images, videos and/or combinations of text, images, and/or videos which communicate visual information to the user of mobile device 110. In one implementation, display 220 may display text input into mobile device 110, text, images, and/or video received from another device, and/or information regarding incoming or outgoing calls or text messages, emails, media, games, phone books, address books, the current time, etc.

Control buttons 230 may include one or more buttons that accept, as input, mechanical pressure from the user (e.g., the user presses a control button or a combination of control buttons) and may send electrical signals to processing unit 320 that may cause mobile device 110 to perform one or more operations. For example, control buttons 230 may be used to cause mobile device 110 to transmit information. Keypad 240 may include a standard telephone keypad, keyboard, or another arrangement of keys. In an alternative implementation, keypad 240 may be presented as part of display 220.

Microphone 250 may include a component to receive audible information from the user and send, as output, an electrical signal that may be stored by mobile device 110, transmitted to another user device, or cause the device to perform one or more operations. Camera 260 may be provided on a front or back side of mobile device 110, and may include a component to receive, as input, analog optical signals and send, as output, a digital image or video that can be, for example, viewed on the display 210, stored in the memory of mobile device 110, discarded and/or transmitted to another mobile device 110.

Although FIG. 2 depicts example components of mobile device 110, in other implementations, mobile device 110 may contain fewer, additional, different, or differently arranged components than illustrated in FIG. 2. In one example, mobile device 110 may also include one or more components described below with reference to FIG. 3. In another example, mobile device 110 may also include one or more additional components used to receive biometric information, in addition to microphone 250 and camera 260, including, for example, a fingerprint scanner, a laser scanner, etc. In still other implementations, one or more components of mobile device 110 may perform one or more tasks described as being performed by one or more other components of mobile device 110.

Figure 3:
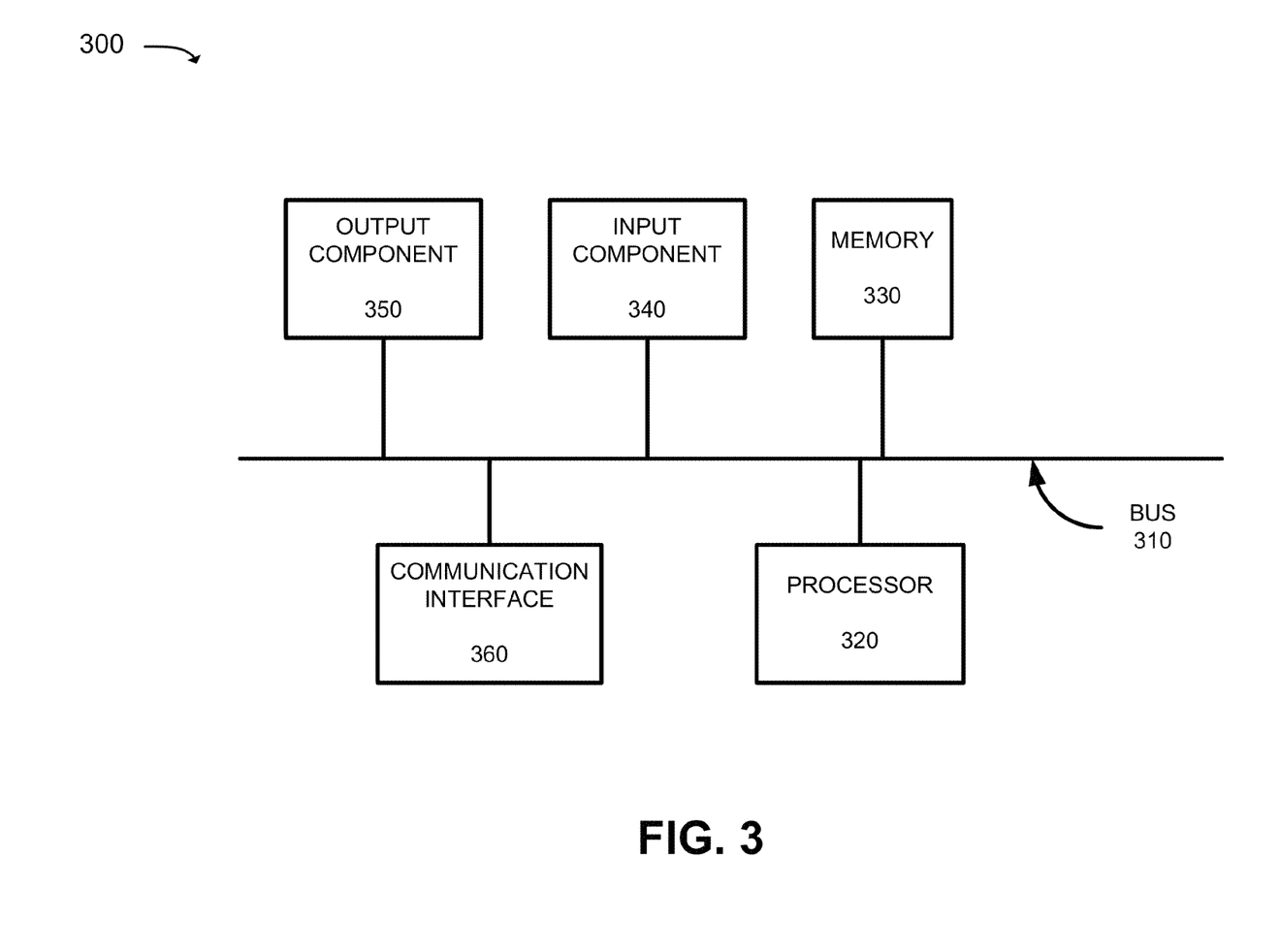
FIG. 3 is a diagram of example components of one or more of the devices of FIG. 1.

FIG. 3 is a diagram of example components of a device 300 that may be associated with mobile device 110, computer terminal 120, web server 130, and/or authentication server 140. Each one of mobile device 110, computer terminal 120, web server 130, and authentication server 140 may include one or more devices 300 and/or one or more of each one of the components of device 300.

As shown in FIG. 3, device 300 may include a bus 310, a processor 320, a memory 330, an input component 340, an output component 350, and a communication interface 360. In another implementation, device 300 may include additional components, fewer components, different components, or differently arranged components than are shown in FIG. 3.

Bus 310 may include a path, or a collection of paths, that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include one or more input mechanisms that permit a user to input information to device 300. Output component 350 may include one or more output mechanisms that output information to the user. Examples of input and output mechanisms may include buttons (e.g., control buttons 230, keys of keypad 240 or a keyboard, a mouse, a joystick, etc.); a touch screen interface to permit data and control commands to be input into device 300; a speaker (e.g., speaker 210) to receive electrical signals and output audio signals; a microphone (e.g., microphone 250) to receive audio signals and output electrical signals; a display (e.g., display 220) to output visual information (e.g., web pages, transaction information, mobile pin pad interface, etc.); a vibrator to cause device 300 to vibrate; a camera (e.g., camera 260) to receive video and/or images; etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit them over the air, and receive RF signals over the air and provide them to communication interface 360. In one implementation, for example, communication interface 360 may communicate with network 150 and/or devices connected to network 150.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, etc.) or other forms of random access memory (RAM) or read only memory (ROM). A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
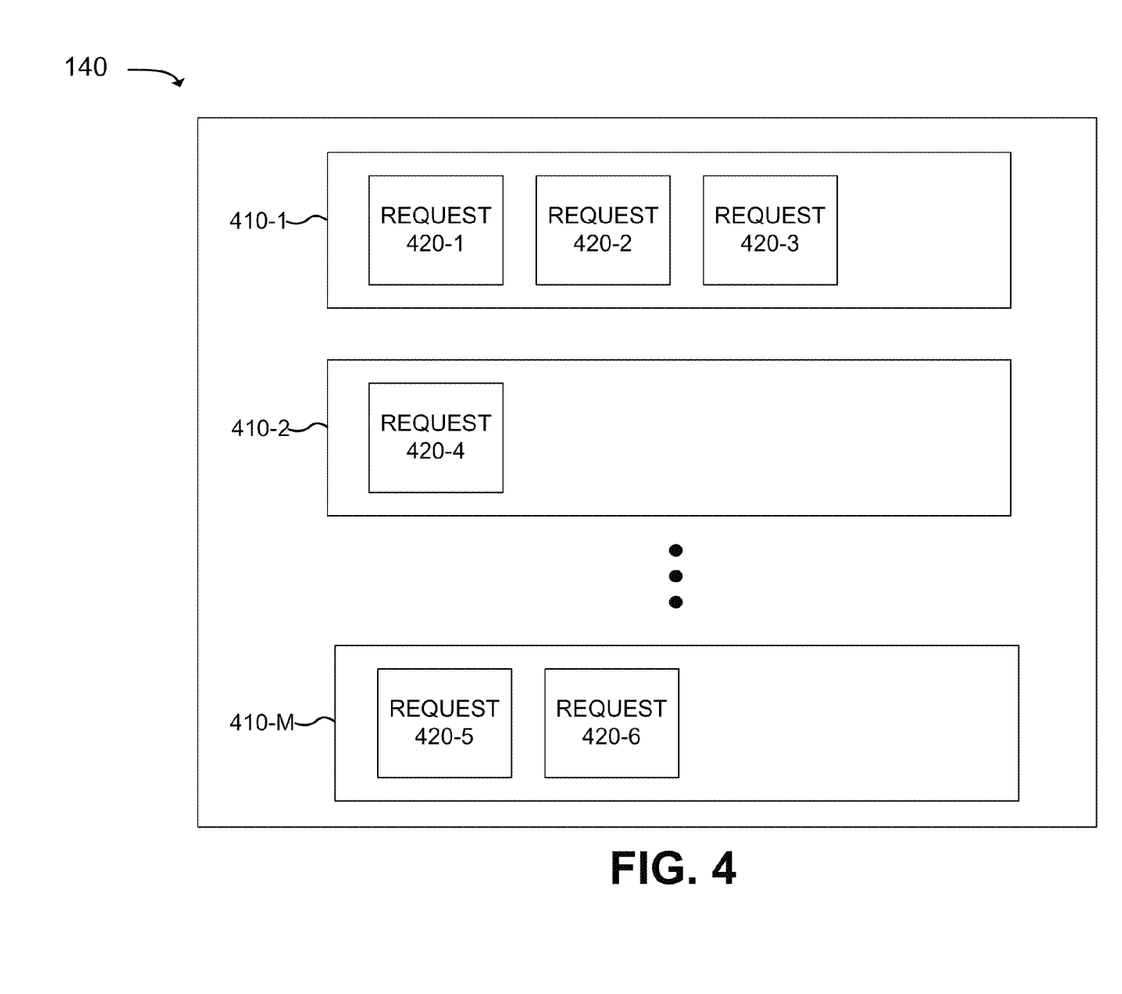
FIG. 4 is a diagram of example functional components of an authentication server of FIG. 1.

FIG. 4 is a diagram of example functional components of authentication server 140. As shown in FIG. 4, authentication server 140 may include queues 410-1, 410-2, . . . , 410-M (where M≥1) (collectively referred to as "queues 410" and individually as "queue 410"). Each one of queues 410 may correspond to a different user. For example, queue 410-1 may correspond to a first user of mobile device 110, queue 410-2 may correspond to a second user of a second mobile device (not shown in FIG. 1), etc.

Queue 410 may represent one or more locations in a memory device. Queue 410 may include, for example, a linked list, continuous blocks of memory locations, an array, a list object, a queue class, and/or one or more other types of data structure.

Queues 410 may store authentication requests 420-1, 420-2, 420-3, 420-4, 420-5, and 420-6 (collectively referred to as "authentication requests 420" and individually as "authentication request 420"). Six authentication requests 420 have been illustrated in FIG. 4 for simplicity. In practice, there may be additional or fewer authentication requests in each one of queues 410.

In one implementation, authentication request 420 may represent an extensible markup language (XML) object/payload that includes information about authentication request 420, as described further below with reference to FIG. 5. In another implementation, authentication request 420 may represent an object that is an instance of a class for authentication requests of a queue. In yet another implementation, authentication request 420 may include one or more types of data structures that store information associated with an authentication request.

Authentication server 140 may receive authentication requests 420 from web server 130 and/or from one or more other web servers (not shown in FIG. 1). Authentication server 140 may receive authentication request 420 from web server 130 when web server 130 requires an authentication of (the identity of) a user of computer terminal 120 and the user requested wireless authentication (e.g., via mobile device 110 of the user).

Authentication server 140 may add a received authentication request 420 to one of queues 410 (e.g., queue 410-1) corresponding to a user (e.g., the user of mobile device 110) identified in the received authentication request 420. For example, as shown in FIG. 4, queue 410-1 may include authentication requests 420-1, 420-2, and 420-3, which are for transactions associated with the first user of mobile device 110. Queue 410-2 may include authentication request 420-4, which is for a transaction associated with the second user of the second mobile device. Queue 410-M may include requests 420-5 and 420-6, which are for transactions associated with a third user of a third mobile device (not shown in FIG. 1).

The user of mobile device 110 may use mobile device 110 (and/or another type of computing device) to access a customer client used for viewing pending authentication requests associated with the user. The customer client may include, for example, a user interface used by the user to interact (e.g., request to view the pending authentication requests, select one of the authentication requests, etc.) with the authentication server 140. In one implementation, the user may access the customer client via a browser. In another implementation, the user may access the customer client via a dedicated application that includes the customer client.

Authentication server 140 may identify which queue (e.g., queue 410-1) is associated with the user when, or before/after, the user accesses the customer client. Authentication server 140 may transmit information about the pending authentication requests (e.g., authentication requests 420-1, 420-2, and 420-3) that are in the identified queue. In one implementation, the customer client may display a list of the pending authentication requests. The user may select a particular authentication request (e.g., authentication requests 420-1) included in the list to view more information about the particular authentication request.

In some implementations, each one of authentication requests 420, in queues 410, may have rules embedded that specify a level of authentication required (e.g., type of authentication information that needs to be provided by the user via mobile device 110) for a particular authentication request (e.g., authentication requests 420-1). As described further below, mobile device 110 may collect (e.g., prompt the user to provide) authentication information from the user, based on the rules embedded in the particular authentication request, when the user selects the particular authentication request from the list of the pending authentication requests.

An operator of web server 130 may use a computer device (not shown in FIG. 1) to access an operator client used for viewing pending authentication requests that have been transmitted by web server 130 and/or from other web servers associated with the operator. The operator client may include, for example, a user interface used by the operator to interact with the authentication server 140. In one implementation, the operator may access the operator client via a browser. In another implementation, the operator may access the operator client via a dedicated application that includes the operator client.

Authentication server 140 may identify one or more authentication requests (e.g., authentication requests 420-3 and 420-6), in one or more of queues 410, that were received from web server 130 and/or the other web servers when, or before/after, the operator accesses the operator client. Authentication server 140 may transmit information about the identified authentication requests to the computer device of the operator. In one implementation, the operator client may display a list of the identified authentication requests associated with the operator. The list may not include any authentication requests associated with other operators (e.g., companies). The operator may select a particular authentication request (e.g., authentication requests 420-3) included in the list to view more information about the particular authentication request.

Figure 5:
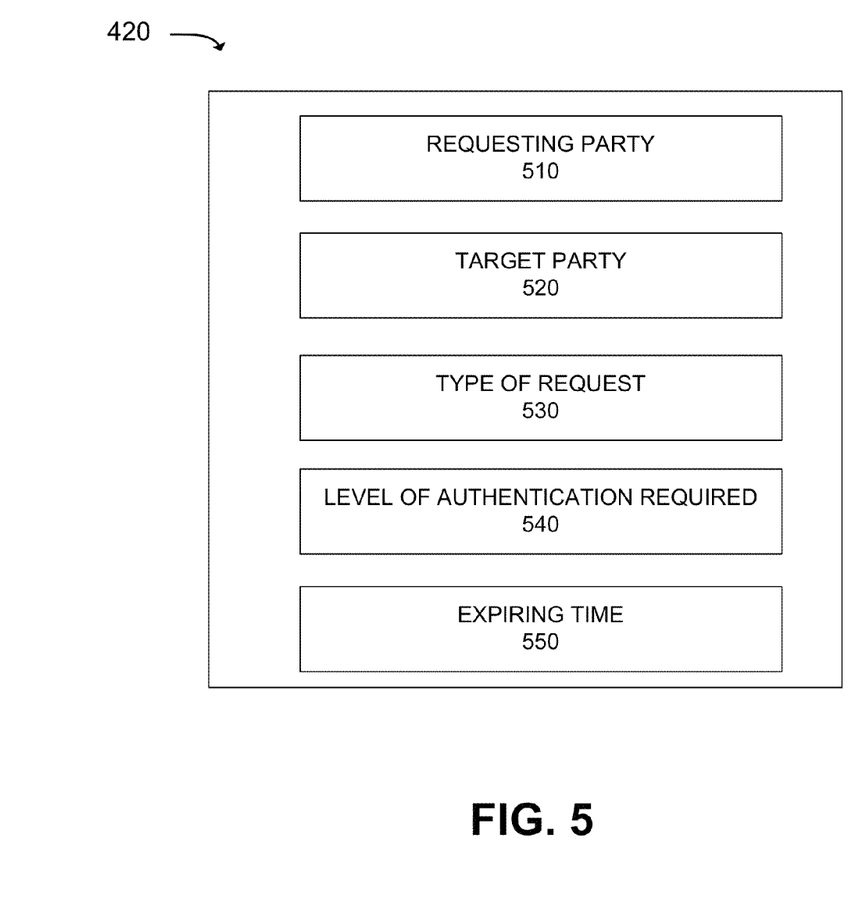
FIG. 5 is a diagram of example components of an authentication request of FIG. 3.

FIG. 5 is a diagram of example fields of authentication request 420. As shown in FIG. 5, request 420 may include one or more of the following fields: a requesting party field 510, a target party field 520, a type of request field 530, a level of authentication required field 540, and/or an expiring time field 550. In another implementation, request 420 may include additional fields, fewer fields, and/or different fields than are shown in FIG. 5.

Requesting party field 510 may include a unique identifier of web server 130 and/or of an operator of web server 130 that issued a request to authenticate an identity of a user via authentication request 420. For example, requesting party field 510 may include a name of an entity (e.g., Example Bank), an address of a website associated with the entity (www.example.com), and/or any other combination of characters that uniquely identifies web server 130, a grouping of web servers that includes web server 130, the entity, the website, and/or a web service provided by the entity.

Target party field 520 may include a user unique identifier of a user who needs to approve a transaction associated with authentication request 420 and/or whose identity needs to be authenticated for web server 130. In one implementation, the user unique identifier may include a non-secret identifier (e.g., a username, a telephone number, an email address, etc.) that the user entered via a log-in webpage, provided by web server 130, to prompt a wireless authentication process associated with the transaction and/or authentication request 420. In another implementation, the user unique identifier may include any other identifier (e.g., a unique character string) shared by web server 130 and authentication server 140 for the user. Authentication server 140 may store user information (e.g., a mobile telephone number of mobile device 110, an identifier of one of queues 410, values for secret credentials and/or biometric information) associated with the user in association with the user unique identifier.

Type of request field 530 may include information that specifies a type of a transaction associated with authentication request 420 and/or a type of action required by the user for the transaction (e.g., to comply with the authentication request). For example, type of request field 530 may specify that the user needs to approve an attempt to access a particular web service; review and approve a particular message; review and approve a particular charge against an account of the user; review and approve a business decision of an entity (e.g., a company) associated with the user; review and approve a request to digitally sign a particular document (e.g., a prescription for controlled substances); etc.

Level of authentication required field 540 may include information that specifies which authentication information the user is required to provide via mobile device 110 in order to be authenticated for authentication request 420. In one implementation, level of authentication required field 540 may include a value that corresponds to a predefined level of authentication required. For example, when the value is equal to "1," the user may need to enter a PIN using mobile device 110; when the value is equal to "2," the user may need to enter a PIN and/or a password; when the value is equal to "3," the user may need to enter a password and provide biometrics information associated with the user (e.g., a retina scan, a voice signature, a facial signature, a fingerprint, etc.); etc.

In another implementation, the level of authentication required field 540 may specify the authentication information that needs to be provided. For example, level of authentication required field 540 may indicate that the user needs to, via mobile device 110, enter a PIN and say a particular authentication phrase (e.g., "my name is Dan M. and I approve this request") to provide voice biometric information. In another example, level of authentication required field 540 may indicate that the user needs to, via mobile device 110, enter a password and provide retina scan information, fingerprint scan information, and/or facial recognition information.

Expiring time field 550 may indicate a particular time at which authentication request 420 expires. The user may not accept and/or provide authentication for authentication request 420 after authentication request 420 expires. The particular time may be a period of time (e.g., 24 hours, 5 minutes, etc.) after the user uses computer terminal 120 to request wireless authentication, after authentication request 420 is transmitted from web server 130, after authentication request 420 is received by authentication server 140, after a notification about authentication request 420 is transmitted from authentication server 140 to mobile device 110, etc.

In some implementations, authentication server 140 may remove authentication request 420 from queue 410 when authentication request 420 expires. Thereafter, authentication server 140 may notify web server 130 and/or mobile device 110 that authentication request 420 has expired.

Figure 6:
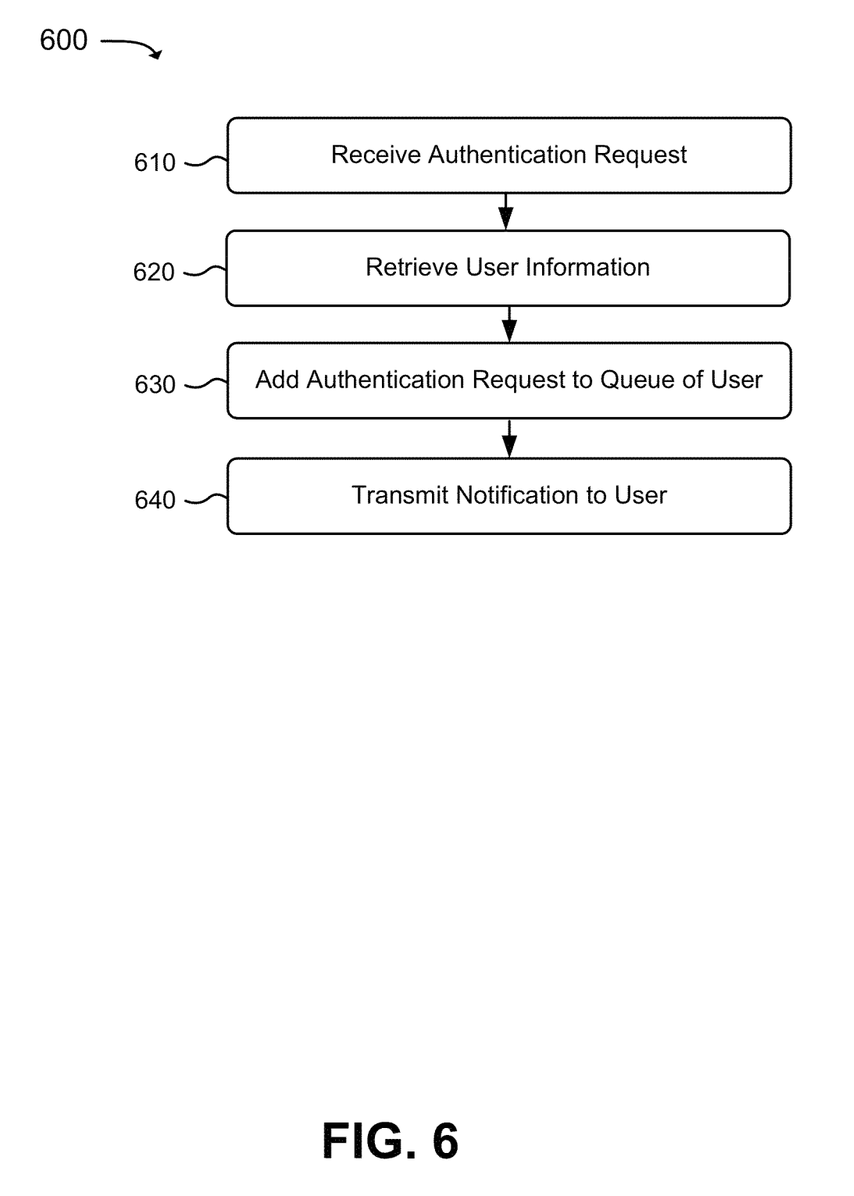
FIG. 6 is a flow chart of an example process for populating queues with authentication requests.

FIG. 6 is a flow chart of an example process 600 for populating queues with authentication requests. In one implementation, authentication server 140 may perform process 600. In another implementation, a device or collection of devices separate from, or in combination with, authentication server 140 may perform some or all of process 600.

Prior to process 600, a user of mobile device 110 may initiate a transaction. In one example, the user may use a browser of computer terminal 120 to access a website associated with web server 130. In some implementations, the browser may store a cookie that indicates that the user uses wireless authentication while accessing web services associated with the website. Accordingly, the website may display an icon that allows the user to request wireless authentication when the icon is selected. The website may also prompt the user to enter a non-secret identifier associated with the user (e.g., a telephone number, an email address, etc.). The user may use computer terminal 120 to select the icon to request the wireless authentication and/or to enter the non-secret identifier in order to initiate or complete the transaction (e.g., access an online portal provided by the website, complete a purchase, etc.). In other implementations, the cookie may include the non-secret identifier of the user. When the user selects the icon to request the wireless authentication, computer terminal 120 may retrieve the non-secret identifier from the cookie.

Web server 130 may receive, from computer terminal 120, the request for the wireless authentication and the non-secret identifier. In response to the request for the wireless authentication, web server 130 may determine that the user requested/needs to be authenticated via a mobile device associated with the user (e.g., mobile device 110). Accordingly, web server 130 may transmit an authentication request to authentication server 140 for authentication server 140 to conduct the wireless authentication.

In another example, a user of mobile device 110 may be a person whose verification is required to approve a transaction (e.g, an executive who needs to give approval for a decision, a doctor who needs to verify a drug prescription for a patient, a parent who needs to provide permission, in a form of a digital signature, for his child, a person who needs to verify her identity to use a credit card to pay online, a first responder who needs to verify her identity when she arrives at an accident scene, etc.). A third party may use computer terminal 120 and/or web server 130 to request an approval for the transaction and authentication of the user doing the approval. Web server 130 may receive a transaction request for the transaction and transmit an authentication request, based on the transaction request, to authentication server 140.

As shown in FIG. 6, process 600 may include receiving an authentication request (block 610). For example, authentication server 140 may receive the authentication request, via network 150, from web server 130. The authentication request may include a requester identifier associated with the website and/or web server 130, a user identifier associated with the user (e.g., the non-secret identifier), information about the transaction (e.g., a type of the transaction and/or a type of action required by the user for the transaction), a level of authentication required, and/or a rule for, or a particular time, when the authentication request expires. The rule may indicate, for example, that the authentication request expires within a particular period of time (e.g., 24 hours) after a time when the authentication request was issued by web server 130 or received by authentication server 140. In one implementation, when the authentication request includes the rule, the authentication request may also include the time when the authentication request was issued. In another implementation, authentication server 140 may track the time when the authentication request is received and/or use some other type of counter to determine when the authentication request expires based on the rule.

Process 600 may further include retrieving user information (block 620). For example, after receiving the authentication request from web server 130, authentication server 140 may determine the user identifier that is included in the authentication request for the user. Authentication server 140 may store or have access to user information that is stored in association with the user identifier. Authentication server 140 may retrieve the user information based on the user identifier. The user information may include a queue identifier of a queue that includes authentication requests for the user and/or unique identifier(s) (e.g., telephone numbers, device identifiers (IDs), etc.) of one or more mobile devices (e.g., including mobile device 110) associated with the user.

Process 600 may also include adding the authentication request to a queue of a user (block 630) and transmitting a notification to the user (block 640). For example, after retrieving the user information, authentication server 140 may add the received authentication request to an end of the queue identified by the queue identifier. After adding the authentication request, authentication server 140 may generate a notification that indicates that a new authentication request was received for the user and/or added to the queue of the user. Alternatively, or additionally, the notification may instruct the user to retrieve the authentication request from the queue. Authentication server 140 may transmit the notification to mobile device 110 and/or one or more other mobile devices of the user, via network 150, by using the unique identifier(s) (e.g., the telephone numbers or the device IDs) included in the user information of the user. Mobile device 110 may receive the notification and display, based on the notification, a message that indicates that the authentication request was received and/or added to the queue of the user. In response to the message, the user may use mobile device 110 to access a customer client to view information about the authentication request and/or to approve the authentication request.

Figure 7:
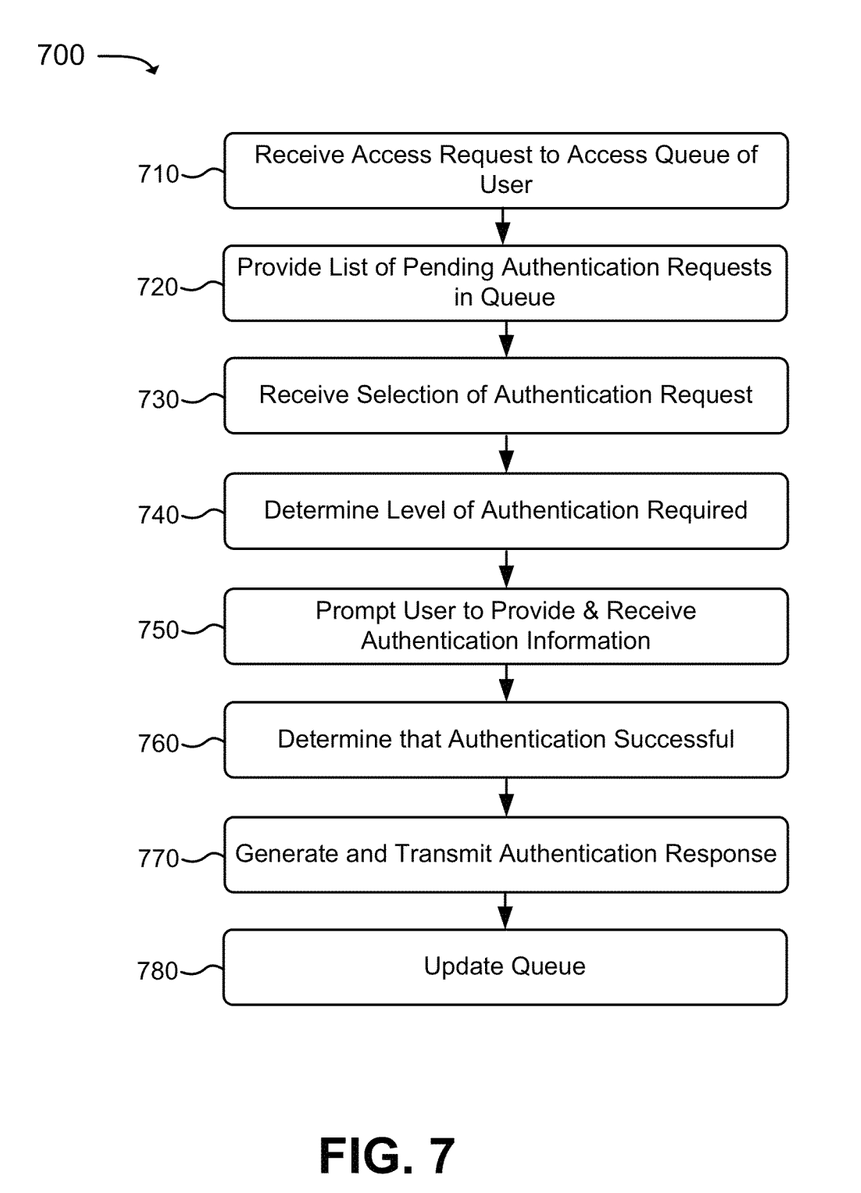
FIG. 7 is a flow chart of an example process for authenticating via a mobile device.

FIG. 7 is a flow chart of an example process 700 for authenticating via mobile device 110. In one implementation, authentication server 140 may perform process 700. In another implementation, a device or collection of devices separate from, or in combination with, authentication server 140 may perform some or all of process 700.

As shown in FIG. 7, process 700 may include receiving an access request to access a queue of a user (block 710) and providing a list of pending authentication requests in the queue (block 720). For example, a user may use mobile device 110 to access a customer client via a browser or a dedicated application. The customer client may prompt the user to use mobile device 110 to enter a non-secret user identifier (e.g., a username) and a secret credential (e.g., a password). Mobile device 110 may transmit, to authentication server 140, the non-secret user identifier and the secret credential as part of an access request to access a queue of the user. Authentication server 140 may determine that the user is allowed to access a queue of the user when the non-secret user identifier and the secret credential match information stored for the user. After determining that the user is allowed to access the queue, authentication server 140 may identify pending authentication requests in the queue. The authentication server 140 may provide a list of the pending authentication requests to the customer client that is open/executing on mobile device 110. The list may include an entry for each one of the pending authentication requests. The entry may include a portion of information included in the corresponding authentication request.

Process 700 may further include receiving a selection of an authentication request (block 730). For example, mobile device 110 may receive the list of the pending authentication requests from authentication server 140. Mobile device 110 may present the list in the customer client. The user may use mobile device 110 to select an authentication request from the list by selecting an entry of the list that corresponds to the authentication request. The selection of the entry may include approving a transaction associated with the authentication request. Mobile device 110 may transmit a message indicating the selection of the authentication request to authentication server 140. Authentication server may receive the selection of the authentication request in the form of the message.

Process 700 may also include determining a level of authentication required (block 740). For example, after receiving the selection of the authentication request, authentication server 140 may determine a level of authentication required for the authentication request. The authentication request may include information about the level of authentication required. The level of authentication required may specify what authentication information needs to be provided by the user, via mobile device 110, in order to successfully authenticate the user for the authentication request.

Process 700 may also include prompting the user to provide and receiving the authentication information (block 750). For example, the level of authentication required may indicate that the user is required to provide a password and an authentication phrase, as a voice biometric, or fingerprint scan information for the authentication request. Authentication server 140 may prompt the user to provide the required authentication information by transmitting instructions to mobile device 110 to request the user to provide the required authentication information. Mobile device 110 may display messages to the user based on the instructions. Mobile device 110 may receive the required authentication information (e.g., the password and the authentication phrase or the fingerprint scan information) via one or more input mechanisms, including, for example, a microphone or a fingerprint scanner. Mobile device 110 may transmit the authentication information to authentication server 140. Authentication server 140 may receive the authentication information from mobile device 110.

In another implementation, process 700 may not include blocks 730-750. Alternatively, rules regarding the level of authentication required may be embedded in each one of the authentication requests, included in the list of the pending authentication requests. After the user selects select an authentication request from the list, mobile device 110 may prompt the user to provide authentication information based on rules embedded in the selected authentication request. Mobile device 110 may collect the authentication information, and transmit a selection of the authentication request, together with the authentication information, to authentication server 140.

In yet another implementation, after receiving the authentication information, authentication server 140 may determine that additional authentication information is required due to weak authentication. Authentication server 140 may determine weak authentication when, for example, mobile device 110 is outside of a particular geographic area and/or is more than a particular distance from computer terminal 120. Authentication server 140 may transmit a prompt to mobile device to receive the additional authentication information, and may receive the additional authentication information in response. For example, rules in the selected authentication request may specify that only a password is required for authentication. After authentication server 140 receives the password entered by the user via mobile device 110, authentication server 140 may determine weak authentication and transmit a PIN prompt to mobile device 110. Authentication server 140 may receive a PIN entered by the user in response.

Returning to FIG. 7, process 700 may also include determining that authentication is successful (block 760). For example, in one implementation, authentication server 140 may store and/or have access to user information that includes authentication values for the user. The authentication values may include a PIN value, a password value, one time passcode, and/or one or more biometric values. In another implementation, the authentication request may include authentication values which the authentication information must match to authenticate the user. Authentication server 140 may determine that an authentication of the user, for the authentication request, is successful when the authentication information, received from mobile device 110, matches corresponding authentication values. Further to the example above, authentication server may determine that the authentication is successful when the password, included in the authentication information, matches the password value and the authentication phrase provided by the user matches an authentication phrase biometric value or the fingerprint scan information matches a fingerprint biometric value.

Process 700 may also include generating and transmitting an authentication response (block 770). For example, after determining that the authentication of the user is successful, authentication server 140 may generate an authentication response. The authentication response may include information to notify web server 130 that the user complied with the authentication request and that the identity of the user was successfully authenticated (e.g., as required by the level of authentication of the authentication request). Authentication server 140 may transmit the authentication response to web server 130. In response to the authentication response, web server 130 may determine that the user is authenticated and/or that the transaction is approved. In one example, when appropriate, web server 130 may provide/grant user access to a portal (e.g., a web page) that requires the authentication of the user prior to granting the access. In another example, web server 130 may approve a transaction requested/associated with the user for which the authentication of the user.

Process 700 may also include updating the queue (block 780). For example, after determining that the authentication is successful and/or after transmitting the authentication response, authentication server 140 may update the queue associated with the user. In one implementation, updating the queue may include indicating that the authentication request is no longer pending and/or that the authentication request has been successfully approved by the user. In another implementation, updating the queue may include removing the authentication request from the queue.

In one implementation, described herein, web server 130 may require a user to provide authentication information before allowing the user to access a web service using computer terminal 120. The user may use wireless authentication to provide the authentication information via mobile device 110. As a result, the user is not subject to a MITM attack because neither the authentication information nor any other secret information, associated with the user, is transmitted between computer terminal 120 and web server 130.

Figure 8:
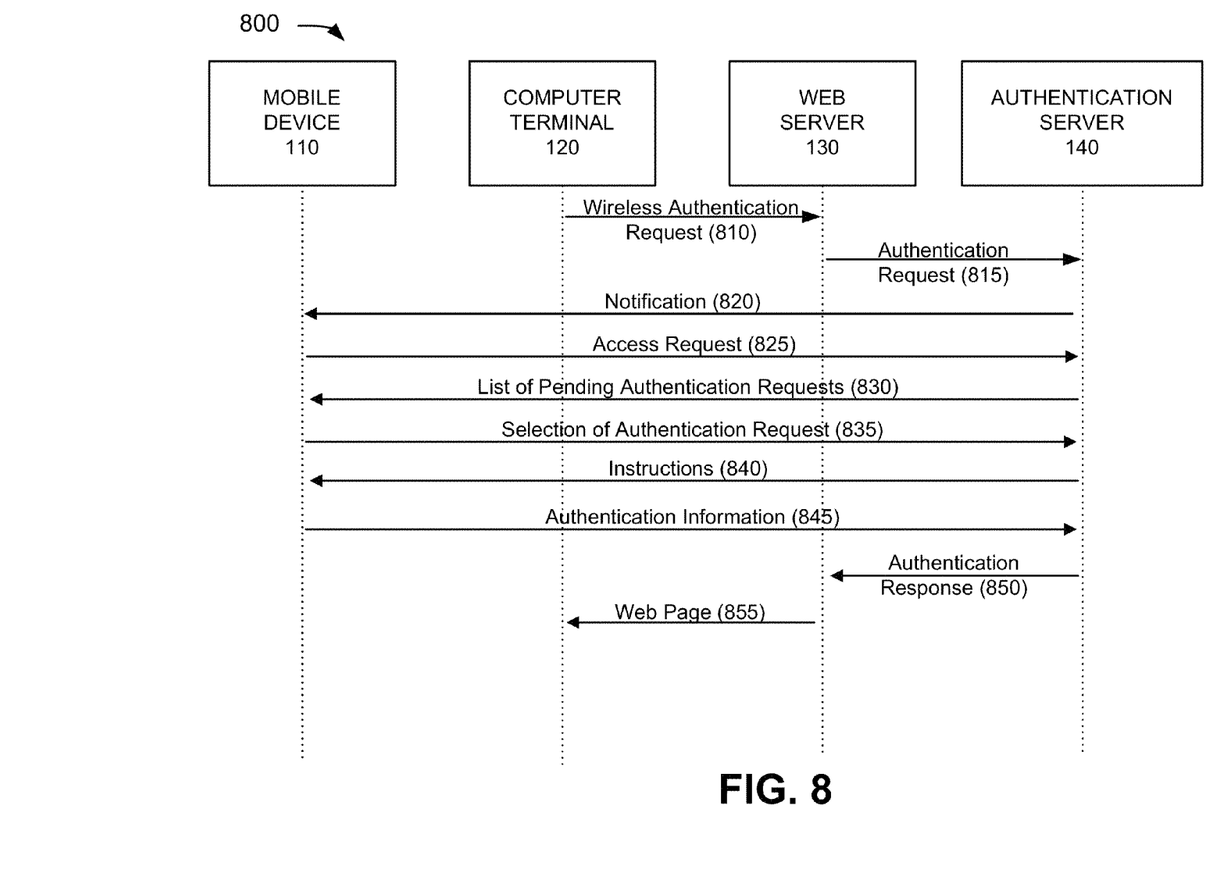
FIG. 8 is a flow diagram of an example authentication of the mobile device.

FIG. 8 is a flow diagram 800 of an example authentication of the mobile device. For example, as shown in FIG. 8, computer terminal 120 may transmit a wireless authentication request 810 to web server 140 when a user uses computer terminal 120 to access a website associated with web server 130 and selects wireless authentication. Wireless authentication request 810 may include a non-secret identifier associated with the user. In response to wireless authentication request 810, web server 130 may transmit an authentication request 815 to authentication server 140 for authentication server 140 to conduct the wireless authentication of the user.

Authentication server 140 may add authentication request 815 to a queue associated with the user, and may transmit a notification 820 to mobile device 110, of the user, to notify the user that authentication request 815 was received and/or added to the queue. After receiving notification 820, the user may use mobile device 110 to transmit an access request 825, to access the queue associated with the user, to authentication server 140. In response to access request 825, authentication server 140 may provide a list of pending authentication requests 830, including an entry for authentication request 815, to mobile device 110.

Mobile device 110 may transmit a selection of authentication request 835 to authentication server 140 when the user uses mobile device 110 to select the entry for authentication request 815. In one implementation, authentication server 140 may determine what authentication information 845 is required for the wireless authentication, and may transmit instructions 840, to prompt the user to provide authentication information 845, to mobile device 110. Mobile device 110 may transmit authentication information 845 to authentication server 140 when the user uses mobile device 110 to enter/provide authentication information 845.

In another implementation, each one of the authentication requests included in list of pending authentication requests 830, including the entry for authentication request 815, may include rules that specify instructions 840. Mobile device 110 may collect authentication information 845 based on the rules embedded in the transaction associated with authentication request 815. Mobile device 110 may transmit selection of authentication request 835, together with authentication information 845, to authentication server 140.

Authentication server 140 may transmit authentication response 850 to web server 130 after authentication server 140 authenticates the identity of the user based on authentication information 845. In response to authentication response 850, web server 130 may provide a web page 855, for which the authentication was required to access, to computer terminal 120. The user may use computer terminal 120 to view and/or interact with web page 855.

The foregoing description provides illustration and description, but is not intended to be exhaustive or to limit the embodiments to the precise form disclosed. Modifications and variations are possible in light of the above teachings or may be acquired from practice of the embodiments.

While series of blocks have been described with regard to FIGS. 6 and 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
 receiving, by a first server device, an authentication request from a second server device;
 adding, by the first server device, the authentication request to a queue of authentication requests associated with a user;
 providing, by the first server device from the queue, a list of authentication requests that are pending for the user to a mobile device of the user, wherein the list of authentication requests includes the authentication request from the second server device;

receiving, by the first server device from the mobile device, a selection of the authentication request by the user from the list of authentication requests that are pending for the user;

transmitting, to the mobile device, instructions to request authentication information from the user in response to receiving the selection of the authentication request, wherein transmitting instructions to request the authentication information comprises:

determining a level of authentication required for the authentication response, wherein the level of authentication required specifies the authentication information required to successfully authenticate the user for the authentication request; and generating the instructions based on the level of authentication required;

receiving, by the first server device and from the mobile device, the authentication information, provided by the user, for the authentication request selected from the list of authentication requests;

determining, by the first server device that authentication, of the user, for the selected authentication request is successful based on the authentication information;

generating, by the first server device, an authentication response that indicates that the authentication, of the user, for the selected authentication request is successful; and transmitting, by the first server device, the authentication response to the second server device.

2. The method of claim 1,
wherein the second server device is associated with a website that requires the authentication of the user before providing access to a web service associated with the website, or
wherein the second server requires the authentication of the user before approving a transaction performed by a third party that requires verification by the user for transaction approval.

3. The method of claim 1, further comprising:
generating the authentication information in response to the instructions.

4. The method of claim 1, wherein only non-secret information of the user is exchanged between a the computer device and the second server device before the first server device receives the authentication request from the second server device.

5. The method of claim 1, wherein the authentication information comprises one or more of:
a pin,
a password,
a one time passcode,
an authentication phrase provided by the user,
a facial signature, or
a fingerprint.

6. The method of claim 1, further comprising:
determining a user identifier, of the user, included in the authentication request, and
retrieving user information of the user based on the user identifier, wherein the user information comprises a queue identifier of the queue and a unique identifier associated with the mobile device.

7. The method of claim 1, wherein providing the list of authentication requests to the mobile device comprises:
transmitting, to the mobile device, a notification about the authentication request,
receiving, from the mobile device, a request to access the queue, and
providing the list of authorization requests from the queue in response to the request to access the queue.

8. The method of claim 7,
wherein the request to access the queue comprises a user identifier and a secret credential, and
wherein the list of authorization requests from the queue is provided only when the user identifier and the secret credential match information stored, by the first server device, for the user.

9. The method of claim 1, wherein determining that the authentication for the selected authentication request is successful comprises:
retrieving authentication values, of the user, from user information stored by the first server, or from the selected authentication request, and
determining that the authentication for the selected authentication request is successful when the authentication information matches corresponding values of the authentication values.

10. The method of claim 1, wherein the list of authentication requests comprises a plurality of authentication requests that are pending for the user.

11. The method of claim 1, wherein each of the plurality of authentication requests includes first data identifying a party requesting authentication of the user via a respective one of the plurality of authentication requests, second data identifying the user that needs to authenticate the respective one of the plurality of authentication requests, and third data that specifies a type of a transaction associated with the respective one of the plurality of authentication requests or a type of action required by the user for the transaction associated with the respective one of the plurality of authentication requests.

12. The method of claim 11, wherein each of the plurality of authentication requests includes fourth data that specifies which authentication information that the user is required to provide via the mobile device in order to be authenticated for a respective one of the plurality of authentication requests.

13. The method of claim 11, wherein each of the plurality of authentication requests includes fourth data that indicates a particular time at which a respective one of the plurality of authentication requests expires.

14. A device comprising:
a memory configured to store a queue associated with a user, wherein the queue stores a list comprising a plurality of authentication requests; and
a processor configured to:
receive an authentication request from a web server associated with a website accessed by the user,
add the authentication request to the list stored in the queue, as one of the plurality of authentication requests,
receive an access request to access the queue from a mobile device of the user,
provide, to the mobile device, the list comprising the plurality of authentication requests in response to the access request, wherein the list includes an entry for the authentication request,
receive a selection of the authentication request from the list comprising the plurality of authentication requests,
prompt the user to provide authentication information for the selected authentication request, wherein, when prompting the user to provide the authentication information, the processor is further configured to:
determine a level of authentication required for the selected authentication request, where the level of authentication required specifies the authentication information required to successfully authenticate the user for the selected authentication request,
determine instructions based on the level of authentication required, and
transmit, to the mobile device, instructions to request the authentication information from the user, and
receive the authentication information from the mobile device.

15. The device of claim 14 wherein the processor is further configured to:
determine the authentication for the user is successful when the authentication information matches authentication values stored for the user or included in the selected authentication request,
generate an authentication response that indicates that the authentication, of the user, for the selected authentication request is successful, and
transmit the authentication response to the web server associated with the selected authentication request.

16. The device of claim 15, wherein, after transmitting the authentication response, the processor is further configured to:
remove the selected authentication request from the queue, or indicate, in the queue, that the selected authentication request is approved by the user.

17. The device of claim 14 wherein each of the plurality of authentication requests includes:
first data identifying a party requesting authentication of the user via a respective one of the plurality of authentication requests, second data identifying the user that needs to authenticate the respective one of the plurality of authentication requests, and third data that specifies a type of a transaction associated with the respective one of the plurality of authentication requests, or a type of action required by the user for the transaction associated with the respective one of the plurality of authentication requests,
fourth data that specifies which authentication information that the user is required to provide via the mobile device in order to be authenticated for a respective one of the plurality of authentication requests, and
fifth data that indicates a particular time at which a respective one of the plurality of authentication requests expires.

18. One or more non-transitory computer-readable media storing instructions executable by one or more processors of a device to perform a method, the method comprising:
receiving an authentication request, associated with a user, from a server, wherein the authentication request involves an interaction between a computer terminal and the server;
adding the authentication request to a queue of authentication requests associated with the user, wherein the queue includes a plurality of authentication requests that are pending for the user;
retrieving, from the queue, a list that includes the plurality of authentication requests;
transmitting, to a mobile device of the user, the list that includes the plurality of authentication requests;
receiving, from the mobile device, a selection by the user of the authentication request from the list that includes the plurality of authentication requests that are pending for the user;
determining a level of authentication required for the selected authentication request, where the level of authentication required specifies authentication information required to successfully authenticate the user for the selected authentication request;
determining instructions based on the level of authentication required;
transmitting the instructions to the mobile device to request the authentication information from the user;
receiving, from the mobile device, the authentication information for the selected authentication request;
determining a successful authentication, of the user, for the selected authentication request when the authentication information matches one or more corresponding values associated with the user;
generating an authentication response that indicates the successful authentication of the user, for the selected authentication request; and
transmitting the authentication response to the server.

19. The media of claim 18, wherein only non-secret information of the user is exchanged between the computer terminal and the server before the authentication request is received from the second server.

20. The media of claim 18, wherein the authentication request comprises one or more of:
an identifier associated with the user or the mobile device, where the mobile device uses the identifier to identify the queue,
types of authentication information required for the authentication request, where the mobile device uses the types of the authentication information to prompt the user to provide the authentication information via the mobile device,
a rule for determining a time when the authentication request expires, where the mobile device uses the rule to determine the time when the authentication request expires, or
the time when the authentication request expires, where the mobile device removes the authentication request from the queue when a current time is equal to the time when the authentication request expires.

* * * * *